(12) United States Patent
Lin et al.

(10) Patent No.: US 8,103,171 B2
(45) Date of Patent: Jan. 24, 2012

(54) METHOD, SYSTEM AND DEVICE FOR DATA TRANSFER IN AN OPTICAL NETWORK

(75) Inventors: Huafeng Lin, Shenzhen (CN); Fan Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 775 days.

(21) Appl. No.: 12/053,189

(22) Filed: Mar. 21, 2008

(65) Prior Publication Data

US 2009/0060521 A1 Mar. 5, 2009

(30) Foreign Application Priority Data

Mar. 23, 2007 (CN) .......................... 2007 1 0090058

(51) Int. Cl.
*H04B 10/26* (2006.01)
(52) U.S. Cl. ........................................ 398/168; 398/185
(58) Field of Classification Search ............... 398/41–42, 398/168–170, 185
See application file for complete search history.

(56) References Cited

U.S. PATENT DOCUMENTS

| | | | | |
|---|---|---|---|---|
| 5,815,295 A * | 9/1998 | Darcie et al. | | 398/72 |
| 6,763,193 B1 * | 7/2004 | Chand et al. | | 398/76 |
| 7,242,868 B2 * | 7/2007 | Soto et al. | | 398/72 |
| 7,286,769 B1 * | 10/2007 | BuAbbud et al. | | 398/155 |
| 7,363,553 B2 * | 4/2008 | Cai et al. | | 714/709 |
| 7,839,939 B2 * | 11/2010 | Lee et al. | | 375/259 |
| 2004/0141748 A1 * | 7/2004 | Spickermann et al. | | 398/72 |
| 2005/0019036 A1 * | 1/2005 | Soto et al. | | 398/135 |
| 2005/0154955 A1 * | 7/2005 | Cai et al. | | 714/746 |
| 2005/0163503 A1 | 7/2005 | Lee et al. | | |
| 2006/0093360 A1 * | 5/2006 | Kim et al. | | 398/71 |
| 2006/0120728 A1 * | 6/2006 | Lee et al. | | 398/140 |
| 2006/0140631 A1 * | 6/2006 | Brolin | | 398/79 |

(Continued)

FOREIGN PATENT DOCUMENTS

| | | |
|---|---|---|
| CN | 1620772 A | 5/2005 |
| CN | 1815936 A | 8/2006 |

OTHER PUBLICATIONS

Guo-Wei Lu ; Ning Deng ; Chun-Kit Chan ; Lian-Kuan Chen, "Use of downstream inverse-RZ signal for upstream data re-modulation in a WDM passive optical network", Mar. 6-11, 2005, IEEE.*

(Continued)

*Primary Examiner* — Leslie Pascal
(74) *Attorney, Agent, or Firm* — Leydig, Voit & Mayer, Ltd.

(57) ABSTRACT

A method for data transfer in an optical network, including: amplitude modulating, by a central office, an optical carrier by a downstream data with a first rate to generate a downstream optical signal carrying the downstream data; sending the downstream optical signal to a user terminal; obtaining, by the user terminal, the downstream data from the downstream optical signal; amplitude modulating, by the user terminal, the downstream optical signal by an upstream data with a second rate to generate an upstream optical signal, wherein the ratio of the first rate to the second rate is greater than 1; sending the upstream optical signal to the central office; and receiving, by the central office, the upstream optical signal, and obtaining, by the central office, the upstream data from the upstream optical signal. Furthermore, the present invention discloses a system and device for data transfer in the optical network. With the invention, the complexity of the system may be effectively reduced, and the cost of the device may be lowered.

17 Claims, 5 Drawing Sheets

U.S. PATENT DOCUMENTS

| | | | |
|---|---|---|---|
| 2006/0146855 A1* | 7/2006 | Kani et al. | 370/430 |
| 2006/0153566 A1* | 7/2006 | Sorin et al. | 398/72 |
| 2006/0177223 A1 | 8/2006 | Hwang et al. | |
| 2006/0182446 A1 | 8/2006 | Kim et al. | |
| 2006/0239682 A1* | 10/2006 | Park et al. | 398/71 |
| 2007/0052570 A1* | 3/2007 | Swerlein et al. | 341/155 |
| 2007/0140706 A1* | 6/2007 | Essiambre et al. | 398/202 |

OTHER PUBLICATIONS

Extended European Search Report in corresponding European Application No. 08153236.8 (Jul. 1, 2008).

Written Opinion of the International Searching Authority in corresponding PCT Application No. PCT/CN2008/070369 (Jun. 5, 2008).

Bohn et al., "Automatic Control of Optical Equalizers," 2004, Optical Society of America, Washington, D.C.

Kim et al., "Effects of Downstream Modulation Formats on the Performance of Bidirectional WDM-PON using RSOA," 2007, Optical Society of America, Washington, D.C.

1$^{st}$ Office Action in corresponding Chinese Application No. 200710090058.X (Oct. 26, 2011).

* cited by examiner

METHOD, SYSTEM AND DEVICE FOR DATA TRANSFER IN AN OPTICAL NETWORK

The present application claims the priority of CN Application No. 200710090058.X filed on Mar. 23, 2007, titled "METHOD, SYSTEM AND DEVICE FOR DATA TRANSFER IN A WDM-PON," which is incorporated herein by reference in its entirety.

FIELD OF THE INVENTION

The present invention relates to the technical field of passive optical network, and in particular, to a method, a system and a device for data transfer in an optical network.

BACKGROUND OF THE INVENTION

In a wavelength division multiplex-passive optical network (WDM-PON), data is transferred in a manner that the optical network unit (ONU) exclusively uses the upstream/downstream wavelengths. In the WDM-PON, different ONUs on the user terminal adopt different operation wavelengths, i.e., the carrier wavelengths used by ONUs for sending the upstream data are different. In order to avoid the case that the ONU devices are different result from lasers of different wavelengths are to be arranged on the ONUs, a colorless ONU needs to be implemented in the WDM-PON. The colorless ONU means that all ONU devices on the user terminal are totally the same, and the ONU devices do not need to be configured with a corresponding laser according to the operation wavelength respectively to provide a carrier light source.

At present, the method for implementing the colorless ONU includes: arranging a continuous broadband light source in an optical line termination (OLT); performing spectrum slicing on a remote node to generate narrow linewidth light sources with a demultiplexer; sending the spectrally sliced wavelengths to the ONU; injection locking or reflective amplifying the spectrally sliced wavelength by the ONU, so that it may be used as the carrier light sources for the upstream data and send the upstream data to the OLT.

Although in the prior art, it is avoided to arrange a laser with specific wavelength in the ONU, a high power broadband light source is required. Furthermore, large amount of energy is wasted when spectrally slicing the broadband light source, so that the cost of data transfer is increased.

Another existing method for implementing the colorless ONU includes using a downstream light as the carrier for upstream data. The downstream optical signal is injection locked or reflective amplified by the ONU, and then the upstream data is modulated onto the amplified downstream light. The synchronization between the downstream optical signal and the upstream data is achieved by adding a synchronization device such as a clock recovers. For making it possible for the ONU to perform injection locking or amplifying the downstream optical signal, it is required that the optical power for the downstream optical signal during each downstream bit can be ensured to be locked or amplified, and when the downstream optical signal has the lowest optical power, i.e., when the downstream data is 0, the optical power of the corresponding downstream optical signal can be locked or amplified. When the upstream data is modulated in the prior art, the optical power of the downstream optical signal corresponding to the downstream data is regulated to increase the optical power of the corresponding downstream optical signal when the downstream data is 0.

It can be seen that although the downstream light may be used as the carrier light source for the upstream data in the prior art, the existing devices need to be modified, and a synchronization device needs to be added, which increases the complexity and cost of the devices. Furthermore, although the optical power of the corresponding downstream optical signal is increased when the downstream data is 0 in the prior art, the extinction ratio of the downstream optical signal and the transmission performance are sacrificed, which causes an increase of the bit error rate of the downstream data, and makes it difficult to determine the downstream data.

It can be seen that in the existing method for implementing the colorless ONU, the complexity of the system as well as the cost of the devices are increased, and the requirements of the WDM-PON applications cannot be met.

SUMMARY OF THE INVENTION

The embodiments of the invention provide a method, a system and a device for data transfer in an optical network, with which the complexity of the system and the cost of the devices may be effectively reduced.

The embodiment of the invention provides a method for data transfer in an optical network, including:

amplitude modulating, by a central office, an optical carrier by a downstream data with a first rate to generate a downstream optical signal carrying the downstream data;

sending the downstream optical signal to a user terminal;

obtaining, by the user terminal, the downstream data from the downstream optical signal;

amplitude modulating, by the user terminal, the downstream optical signal by an upstream data with a second rate to generate an upstream optical signal, wherein the ratio of the first rate to the second rate is greater than 1;

sending the upstream optical signal to the central office; and receiver, by the central office, the upstream optical signal, and obtaining, by the central office, the upstream data from the upstream optical signal.

The embodiment of the invention provides an optical network system, including a central office device and at least one user device, wherein the central office device includes a transmitting module and a receiving module; wherein the transmitting module of the central office device is adapted to amplitude modulate with a first rate downstream data onto an optical carrier so as to generate a downstream optical signal carrying the downstream data, and send the downstream optical signal to the at least one user device;

the user device includes a transmitters module and a receiving module; wherein the receiving module of the user device is adapted to receive the downstream optical signal from the central office device, and obtain the downstream data;

the transmitting module of the user device is adapted to amplitude modulate with a second rate upstream data onto the downstream optical signal so as to generate an upstream optical signal, and send the upstream optical signal to the central office device; wherein a ratio of the first rate to the second rate is greater than 1; and the receiving module of the central office is adapted to receive the upstream optical signal from the at least one user device, and obtain the upstream data.

The embodiment of the invention further provides a central office device, including a transmitting module and a receiving module, wherein the transmitting module is adapted to amplitude modulate with a first rate downstream data onto an optical carrier so as to generate a downstream optical signal carrying the downstream data, and send the downstream optical signal to at least one user device; and the receiving module is adapted to receive an upstream optical signal from the at least one user device, and obtain the upstream data, wherein the upstream data is amplitude modulated with a second rate onto the downstream optical signal, and a ratio of the first rate to the second rate is greater than 1.

The embodiment of the invention further provides a user device, including a receiving module and a transmitting module, wherein the receiving module is adapted to receive an optical signal, obtain downstream data, wherein a rate of the downstream data is a first rate; and the transmitting module is adapted to amplitude modulate with a second rate upstream data onto a downstream optical signal so as to generate an upstream optical signal, and send the upstream optical signal to a central office device; wherein a ratio of the first rate to the second rate is greater than 1.

It can be seen from the above solutions that in the embodiments of the invention, the upstream data and the downstream data are transmitted by an asymmetric transmission mode, i.e., the ratio of the first rate for downstream optical signal transmission to the second rate for upstream optical signal transmission is greater than 1. Thus, the downstream optical signal used as carrier and the upstream optical signal are differentiated effectively, so that a synchronization device such as clock recover is not needed when remodulation is performed on the upstream data, the complexity of the system as well as the cost of the device are reduced effectively, which boosts the development of the WDM-PON.

Furthermore, in the embodiments of the invention, the downstream optical signal is used as the carrier for the upstream data, and a coding is performed on the downstream data. Thus, energy is saved, and it is ensured at the same time that the downstream optical signal has a relatively high extinction ratio and transmission performance, and a stable transmission of the downstream data is realized.

DETAILED DESCRIPTION OF THE EMBODIMENTS

In order to make the objects, technical solutions and advantages of the embodiments of the invention clearer, examples are used hereinafter to further illustrate the embodiments of the present invention. It should be noted that a wavelength division multiplex-passive optical network (WDM-PON) is taken as an example with respect to the optical network in the embodiments of the invention.

Figure 1:
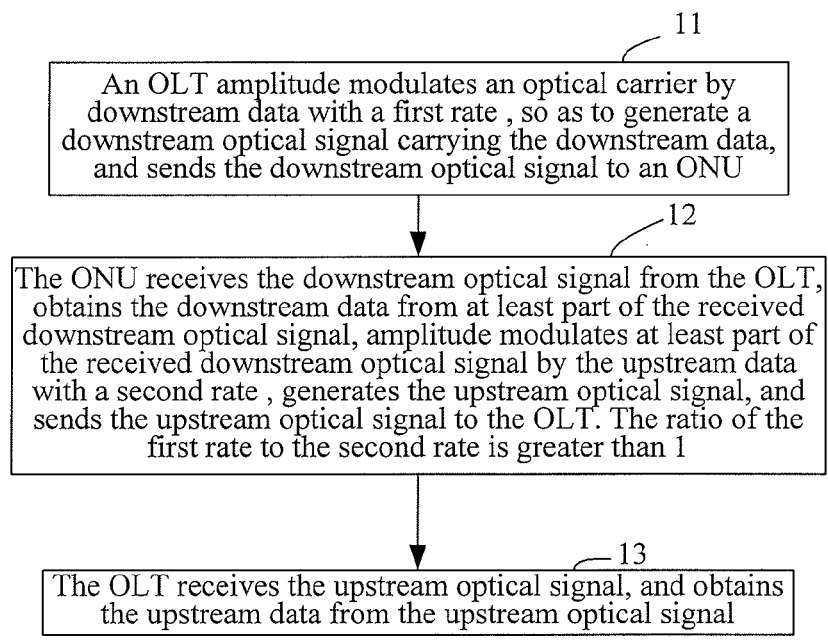
FIG. 1 is a general flow chart of a method for data transfer in a WDM-PON in an embodiment of the invention.

FIG. 1 shows the procedure of data transfer in a WDM-PON according to an embodiment of the invention. In the present embodiment, the optical line termination (OLT) is taken as an example with respect to the central office device and the optical network unit (ONU) is taken as an example with respect to the user device. However, these examples are not limitation, i.e., devices with similar functions may be used. As shown in FIG. 1, in an embodiment of the invention, the method for implementing a colorless ONU includes the following processes.

Process 11: An optical carrier is amplitude modulated by downstream data with a first rate at OLT, so as to generate a downstream optical signal carrying the downstream data, and sends the downstream optical signal to an ONU.

Preferably, in the embodiment of the invention, before an optical carrier is amplitude modulated by downstream data with a first rate, the OLT may perform coding for the downstream date with a coding mode such as the Manchester coding or Inverse Return to Zero (IRZ) coding, so that there is optical power for the downstream optical signal carrying the downstream data during each downstream bit. The preferred embodiment of the invention is implemented with the Manchester coding or IRZ coding. However, the coding mode is not limited thereto. Any coding mode that makes it possible that there is optical power for the downstream optical signal during each downstream bit falls within the protection scope of the present invention.

In the embodiment of the invention, the OLT may perform an amplitude modulation with a direct modulation method or an external modulation method.

In the embodiment of the invention, the downstream light source that provides a carrier signal may be a plurality of single wavelength lasers, or may be a broadband light source. When a broadband light source is used as the downstream light source, spectrum slicing is performed on the broadband light source, so as to generate narrow linewidth light sources with discrete and different wavelengths. The spectrally sliced wavelength is inversely injected into a mode-locked light source of the OLT for locking and amplifying, so that the downstream light source with a corresponding wavelength is generated.

Process 12: The ONU receives the downstream optical signal from the OLT, obtains the downstream data from at least part of the received downstream optical signal, part of the received downstream optical signal are amplitude modulated by the upstream data with a second rate to generate the upstream optical signal, and sends the upstream optical signal to the OLT. The ratio of the first rate to the second rate is greater than 1. Here the upstream data is coded data.

In the embodiment of the invention, the ONU modulates the downstream optical signal by the coded upstream data, so as to generate the upstream optical signal, and meanwhile, the ratio of the first rate with which the downstream data is transferred to the second rate with which the upstream data is transferred is greater than 1. Thus, on one hand the downstream optical signal is effectively used, and on the other hand the central office may obtain the upstream data from the downstream optical signal that is used as the carrier through the re-modulation by the upstream data. Here the ONU may perform coding on the upstream data through a coding method such as NRZ coding.

When the downstream optical signal is received, the ONU may divide the downstream optical signal into two parts. One part is used as the carrier light source for the upstream data, and the other part is used to obtain the downstream data.

Using the downstream optical signal by dividing it into two parts is only a preferred example of the present invention. When the embodiment of the invention is implemented, all the methods in which the downstream optical signal is used as the carrier light source for the upstream optical signal fall within the protection scope of the invention.

Because the downstream optical signal may be attenuated during the transmission, amplification may be performed for the downstream optical signal before the ONU modulates the downstream optical signal by the upstream data, so as to ensure the quality of the downstream optical signal which is used as the carrier light source.

Process 13: The OLT receives the upstream optical signal, and obtains the upstream data from the upstream optical signal.

In the embodiment of the invention, when the OLT receives the upstream optical signal, the upstream optical signal is photo-electric converted into the upstream electrical signal, and an integral calculus is carried out for the electrical power of the upstream electrical signal in the upstream bit. When the integral value is greater than a preconfigured threshold value, it is determined that the upstream data is 1; otherwise, it is determined that the upstream data is 0.

Furthermore, the OLT may also perform a low pass filtering for the upstream optical signal. In other words, when the photo-electric conversion is performed for the upstream optical signal, the high frequency carrier signal is filtered out with a low pass filter whose cutoff frequency is the bandwidth of the upstream signal, that is an envelope signal carrying the upstream data is obtained, and the upstream data is obtained by performing a sampling and judgment on the envelope signal.

With the method for obtaining the upstream data according to the embodiment of the invention, the upstream data may be effectively obtained from the downstream optical signal, and no synchronization device such as clock recover is required when the re-modulation on the upstream data is performed.

Figure 2:
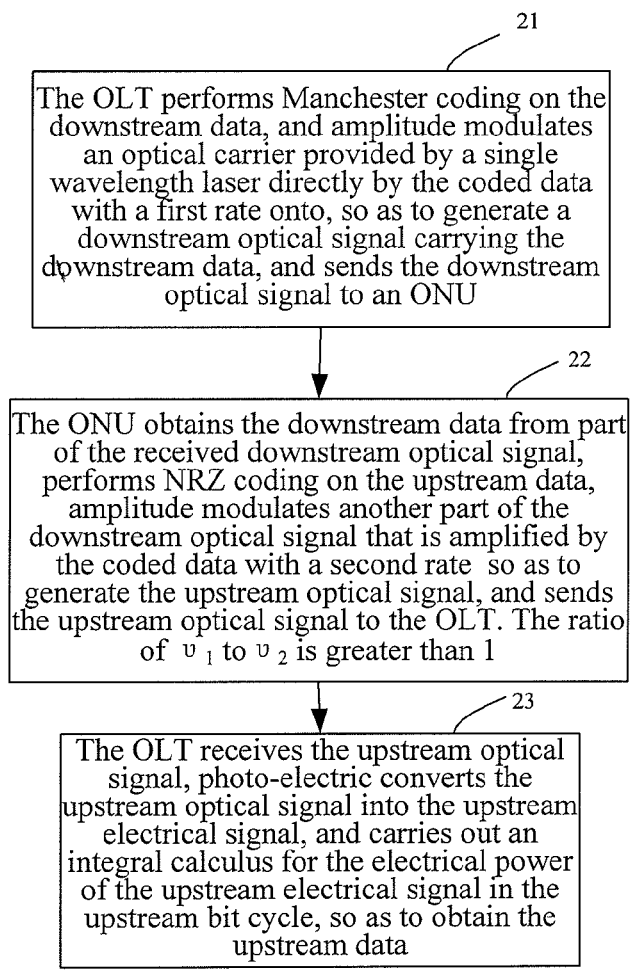
FIG. 2 is a flow chart of an embodiment of the method for data transfer in the WDM-PON in an embodiment of the invention.

FIG. 2 is a flow chart of the method for data transfer in the WDM-PON in an embodiment of the invention. In this embodiment, the central office device is an OLT, and the user devices are N ONUs, wherein the N is an integer greater than 1, such as 1, 2, 3, etc. As shown in FIG. 2, following processes are included.

Process 21: The OLT performs Manchester coding on the downstream data, and amplitude modulates an optical carrier that provided by a single wavelength laser by the coded data with an first rate of $v_1$, so as to generate a downstream optical signal carrying the downstream data, and sends the downstream optical signal to an ONU.

Figure 3:
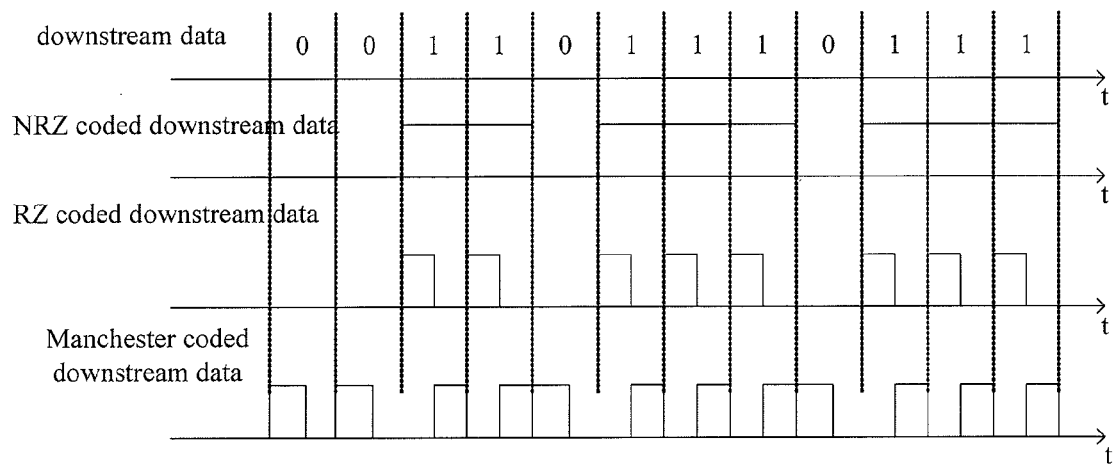
FIG. 3(a) is a schematic diagram showing the Manchester coding format in an embodiment of the invention.
FIG. 3(b) is a schematic diagram showing the remodulation of the upstream data in an embodiment of the invention.
Figure 3:
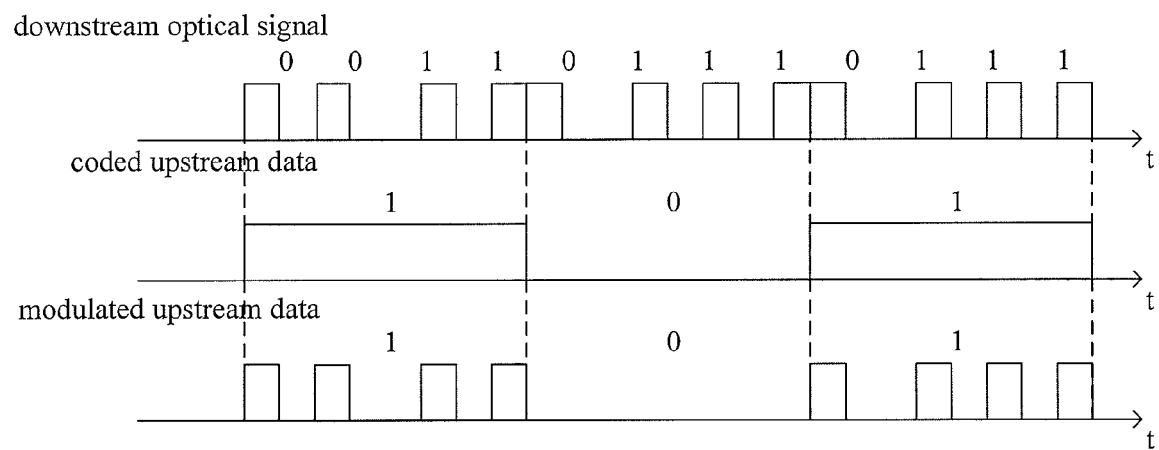

In this embodiment of the invention, the Manchester encoding mode is used by the OLT for encoding the downstream data. FIG. 3(a) is a schematic diagram showing the Manchester coding format used in the embodiment of the invention. As shown in FIG. 3(a), through the Manchester coding, there is optical power for the coded optical signal during each downstream bit.

In this embodiment of the invention, the light source that provides the downstream optical signal is a single wavelength laser. The central office arranges N single wavelength lasers with different wavelengths in correspondence with N ONUs according to the requirements of the data transfer. When a broadband light source is used for providing different transmitting modules of the central office with the light source of the downstream optical signal, spectrum slicing is performed for the broadband light source, so as to generate discrete narrow linewidth light sources with different wavelengths. The spectrally sliced wavelengths are inversely injected into a mode-locked light source in the OLT for locking and amplifying, so that the downstream light source with a corresponding wavelength is generated.

Process 22: The ONU obtains the downstream data from part of the received downstream optical signal, performs NRZ coding on the upstream data, amplitude modulates another part of the downstream optical signal that is amplified by the coded data with an rate Of $v_2$, so as to generate the upstream optical signal, and then sends the upstream optical signal to the OLT. The ratio of $v_1$ to $v_2$ is greater than 1.

In this embodiment of the invention, in order to facilitate obtaining the upstream data by parsing the re-modulated downstream optical signal, the ratio of $v_1$ to $v_2$ is 4:1.

FIG. 3(b) is a schematic diagram showing the re-modulation of the upstream data in this embodiment of the invention. The ratio of $v_1$ to $v_2$ is 4:1, i.e., 4 bits of the downstream signal are used to represent 1 bit of upstream data. There is optical power for the downstream optical signal during each downstream bit. Therefore, when the data to be transferred in upstream is 1, no matter what data is transferred in downstream, there is optical power during the upstream bit cycle after the re-modulation of the upstream data. When the data to be transferred in upstream is 0, there is no optical power during the upstream bit cycle after the re-modulation of the upstream data. Thus, the upstream data and the downstream data are differentiated. In combination with the corresponding receiver method for the upstream data in the OLT, the upstream data may be effectively detected from the re-modulated optical signal.

In this embodiment of the invention, the ratio of $v_1$ to $v_2$ is 4:1, which is only a preferred embodiment of the invention. The ratio may also be 6:1 or 8:1, etc. All the ratios of the upstream data modulation rate to the downstream data modulation rate that enable the differentiation between the upstream data and the downstream data fall within the protection scope of the invention.

Process 23: The OLT receives the upstream optical signal. The upstream optical signal is photo-electric converted into the upstream electrical signal, and an integral calculus is carried out for the electrical power of the upstream electrical signal in the upstream bit cycle, so as to obtain the upstream data.

When the upstream optical signal is received, the OLT performs photo-electric conversion on the upstream optical signal and carries out the integral calculus for the electrical power in each upstream bit. When the integral value is greater than a preconfigured threshold value, it is determined that the upstream data is 1; otherwise, it is determined that the upstream data is 0.

In this embodiment of the invention, the Manchester coding is used in combination with the mode that a plurality of downstream bits are used for modulation of one upstream bit, as well as in combination with the corresponding receiver method for the upstream data. Therefore, the upstream data and downstream data carried on the same optical signal may be effectively transferred, and furthermore, it is avoided to use a synchronization device such as clock recover when the upstream data is modulated in the ONU. In other words, even if a forward or backward shift of the upstream time slot occurs during the re-modulation of the upstream data, the judgment of the OLT with respect to the upstream data is not affected. For detailed illustration please refer to the following embodiment of the invention.

Figure 4:
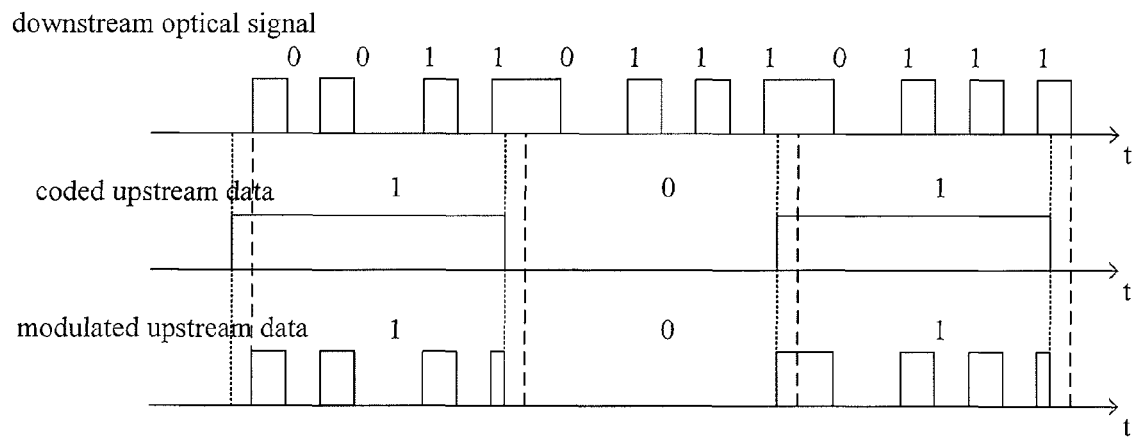
FIG. 4 is a schematic diagram showing the modulation of the upstream data by an OLT when the upstream time slot is shifted backwards in an embodiment of the invention.

FIG. 4 is a schematic diagram showing the modulation of the upstream data when the upstream time slot is shifted backwards. As shown in FIG. 4, when a re-modulation is performed on the upstream data, the upstream time slot is shifted backwards. If in the process 23, the upstream data is determined by carrying out the integral calculus for the electrical power in an upstream bit, the backward shift of the upstream time slot may not cause a sharp fluctuation of the optical power in an upstream bit cycle, and after the photo-electric conversion of the upstream optical signal, a sharp fluctuation of the electrical power in an upstream bit cycle may not be induced, so that the judgment of the upstream data may not be affected.

If in the process 23, the upstream data is obtained through performing a low pass filtering for the upstream optical signal, the backward shift of the upstream time slot may not cause a sharp fluctuation of the envelop signal corresponding to the upstream optical signal, so that the judgment of the upstream data may not be affected.

Figure 5:
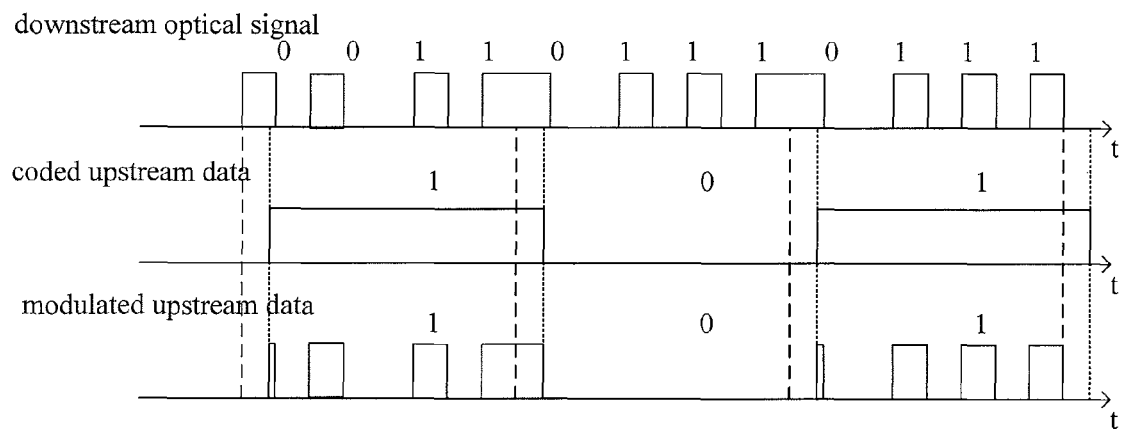
FIG. 5 is a schematic diagram showing the modulation of the upstream data by an OLT when the upstream time slot is shifted forwards in an embodiment of the invention.

FIG. 5 is a schematic diagram showing the modulation of the upstream data when the upstream time slot is shifted forwards. As shown in FIG. 5, when re-modulation is performed on the upstream data, the upstream time slot is shifted forwards. If in the process 23, the upstream data is determined by carrying out the integral calculus for the electrical power in an upstream bit cycle, the forward shift of the upstream time slot may not cause a sharp fluctuation of the optical power in an upstream bit cycle, and after the photo-electric conversion of the upstream optical signal, a sharp fluctuation of the electrical power in an upstream bit cycle may not be induced, so that the judgment of the upstream data may not be affected.

If in the process 23, the upstream data is obtained through performing a low pass filtering for the upstream optical signal, the forward shift of the upstream time slot may not cause a sharp fluctuation of the envelope signal corresponding to the upstream optical signal, so that the judgment of the upstream data may not be affected.

It can be seen that when the embodiments of the invention are applied, the user device may perform OOK directly on the upstream data, and then modulate the downstream optical signal by the upstream data. It is not necessary to add the synchronization device such as clock recover, so that the complexity and cost of the device is reduced.

Figure 6:
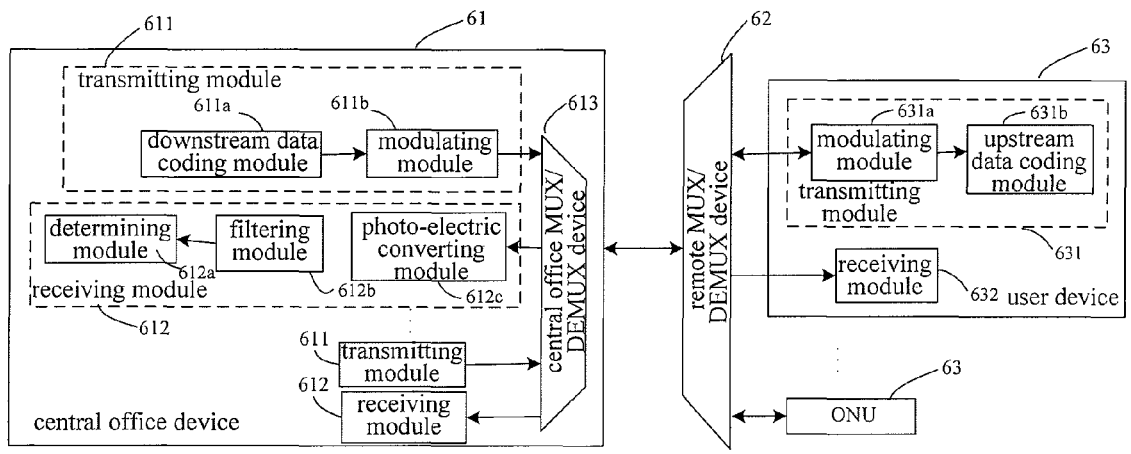
FIG. 6 is a schematic diagram showing a first embodiment of the structure of a system for data transfer in the WDM-PON in an embodiment of the invention.

FIG. 6 is a schematic diagram showing a first embodiment of the structure of a system for data transfer in the WDM-PON. As shown in FIG. 6, in the embodiment of the invention, the system for data transfer in the WDM-PON includes a central office device, a remote wavelength division multiplexing/demultiplexing (MUX/DEMUX) device and N user devices, where N is an integer greater than 1, such as 1, 2, 3, . . . .

The central office device 61 includes N transmitting module 611, N receiving module 612 and a central office MUX/DEMUX device 613. Corresponding to each user device 63, there are a transmitting module 611 and a receiving module 612 operating in a specific wavelength in the central office device respectively.

The transmitting module 611 is adapted to modulate with a first rate the downstream data onto the optical carrier, generate a downstream optical signal carrying the downstream data, and send the downstream data to a remote MUX/DEMUX device 62 with the downstream optical signal via the central office MUX/DEMUX device 613.

The receiving module 612 is adapted to receive the upstream optical signal from at least one of the user devices, and obtain the upstream data from the upstream optical signal.

The central office MUX/DEMUX device 613 is adapted to multiplex the downstream optical signals with different wavelengths from one or more transmitting modules 611 into one downstream optical signal, and send the multiplexed downstream optical signal to the remote MUX/DEMUX device 62. The central office MUX/DEMUX device 613 is further adapted to demultiplex the upstream optical signal containing a plurality of wavelengths from the remote MUX/DEMUX device 62 into the optical signals with corresponsive different wavelengths, output the demultiplexed optical signals to a plurality of output ports, and send the demultiplexed optical signals to the corresponding receiving modules 612.

The transmitting module 611 includes a downstream data coding module 611a and a modulating module 611b.

The downstream data coding module 611a is adapted to encode the downstream data, so that there is optical power for the downstream optical signal corresponding to the coded downstream data during each downstream bit. Then the downstream data coding module 611a sends the coded downstream data to the modulating module 611b.

When the embodiment of the invention is applied, the downstream data coding module 611a may use the Manchester coding or IRZ coding. Any coding mode that makes it possible that there is optical power for the downstream optical signal corresponding to the coded downstream data in each downstream bit cycle falls within the protection scope of the present invention.

The modulating module 611b is adapted to receive the coded downstream data from the downstream data coding module 611a, modulate the optical carrier by the coded downstream data with the first rate so as to generate the downstream optical signal carrying the downstream data, and send the downstream optical signal to the central office MUX/DEMUX device 613.

Preferably, when the embodiment of the invention is applied, the modulating module 611b may be a directly modulated light source module. The directly modulated light source module is adapted to modulate a downstream light source directly by the coded downstream data from the downstream data coding module 611a so as to generate the downstream optical signal carrying the downstream data, and send the downstream optical signal to the central office MUX/DEMUX device 613.

Preferably, when the embodiment of the invention is applied, the modulating module 611b may be a single wavelength light source and external modulator. The single wavelength light source is adapted to generate the optical signal and send the optical signal to the external modulator. The external modulator is adapted to receive the coded downstream data from the downstream data coding module 611a and receive the optical signal from the single wavelength light source, amplitude modulate the optical signal by the coded downstream data, and send the downstream optical signal carrying the downstream data to the central office MUX/DEMUX device 613.

Preferably, when the embodiment of the invention is applied, the modulating module 611b may also be a broadband light source (BLS) and a mode-locked light source with modulation function. The BLS is adapted to perform spectrum slice via the central office MUX/DEMUX device 613, generate narrow linewidth light sources, and inversely inject the narrow linewidth light sources into the mode-locked light source. The mode-locked light source is adapted to lock and amplify the narrow linewidth light sources obtained from the BLS, generate the optical signal, amplitude modulate the optical signal by the coded downstream data received from the downstream data coding module 611a to generate the downstream optical signal carrying the downstream data, and send the downstream optical signal to the central office MUX/DEMUX device 613. The mode-locked light source may be a reflective semiconductor optical amplifier (RSOA) with modulation function, or may be an mode-locked Fabry-Perot Laser Diode (FP-LD) with modulation function.

The receiving module 612 may include a determining module 612a, a filtering module 612b and a photo-electric converting module 612c.

The photo-electric converting module 612c is adapted to receive the upstream optical signal from the central office MUX/DEMUX device 613, photo-electric convert the upstream optical signal to the upstream electrical signal, and send the upstream electrical signal to the filtering module 612b.

The filtering module 612b is adapted to receive the upstream electrical signal from the photo-electric converting module 612c, perform low pass filtering for the upstream electrical signal to filter out the high frequency carrier signal, and send the envelope signal corresponding to the upstream data to the determining module 612a.

The determine module 612a is adapted to receive the envelope signal from the filtering module 612b, and obtain the upstream data through sampling and determining the envelope signal; and/or is adapted to receive the integral result from the integral module. When the integral value is greater than a preconfigured threshold value, it is determined that the upstream data carried in the upstream bit cycle is 1; otherwise, it is determined that the upstream data in the upstream bit cycle is 0.

When the embodiment of the invention is applied, the receiving module 612 may also include: a photo-electric converting module, an integral module and a determine module. In other words, to obtain the upstream data, the receiving module 612 in the central office may also use the integral module to replace the filtering module 612b, receive the upstream electrical signal from the photo-electric converting module 612c, perform integral calculus for the electrical power of the upstream electrical signal in the upstream bit cycle, and send the integral result to the determining module 612a. When the integral module is used to obtain the upstream data, the determining module 612a is used to receive the integral result of the integral module. When the integral value is greater than the preconfigured threshold value, it is determined that the upstream data carried in the upstream bit cycle is 1; otherwise, it is determined that the upstream data in the upstream bit cycle is 0.

The remote MUX/DEMUX device 62 is adapted to transmit optical signal between the central office device 61 and the user device 63, demultiplex the downstream optical signal containing a plurality of wavelengths from the central office device 61 into optical signals of corresponsive wavelengths, route the optical signals to the respective output ports of the remote MUX/DEMUX device 62, and then send the optical signals to the corresponding user devices 63. Furthermore, the remote MUX/DEMUX device 62 is adapted to multiplex the upstream optical signals of different wavelengths from various user terminals 63 into one optical signal, and send the optical signal to the central office device 61.

In the embodiment of the invention, the central office MUX/DEMUX device 613 and the remote MUX/DEMUX device 62 may be implemented with filters. In this embodiment, the MUX/DEMUX device implemented with an Arrayed Waveguide Grating is taken as an example.

The user device 63 includes a transmitting module 631 and a receiving module 632.

The transmitting module 631 is adapted to receive the downstream optical signal from the remote MUX/DEMUX device 62, amplitude modulate the downstream optical signal by the upstream data with the second rate so as to generate the upstream optical signal, and send the upstream optical signal to the remote MUX/DEMUX device 62.

The receiving module 632 is adapted to receive the downstream optical signal from the remote MUX/DEMUX device 62, and obtain the downstream data from the downstream optical signal. According to the content of the context, the obtained downstream data may be the data coded with the Manchester coding or the IRZ coding.

The transmitting module 631 further includes a modulating module 631a and an upstream data coding module 631b.

The upstream data coding module 631b is adapted to code the upstream data, and transmit the coded upstream data to the modulating module 631a.

The modulating module 631a is adapted to receive the coded upstream data from the upstream data coding module 631b as well as the downstream optical signal from the remote MUX/DEMUX device 62, amplitude modulate the downstream optical signal by the coded upstream data with the second rate so as to generate the upstream optical signal, and send the upstream optical signal to the remote MUX/DEMUX device 62. Here the ratio of the first rate to the second rate is greater than 1.

In the embodiment of the invention, the modulating module 631a may be a semiconductor optical amplifier (SOA) with modulating function, a reflective semiconductor optical amplifier (RSOA) with modulating function, a Fabry-Perot Laser Diode (FP-LD) with modulating function, or may be an Electro Absorption Modulator (EAM), etc.

In the embodiment of the invention, different modules may be located in the same physical entity.

In this embodiment of the invention, the central office device for data transfer in the WDM-PON is the central office device in the embodiment as shown in FIG. 6. In this embodiment of the invention, the user device for data transfer in the WDM-PON is the user device in the embodiment as shown in FIG. 6. In other words, the central office device may be an optical line termination (OLT), the OLT includes a transmitting module and a receiving module. The transmitting module includes an upstream data coding module and a modulating module. The user device may be an optical network unit (ONU), the ONU includes a transmitting module and a receiving module. In the embodiment of the invention, the central office device and the user device may also exist in the network independently. The constitution and structure are illustrated above, and will not be described again here.

Figure 7:
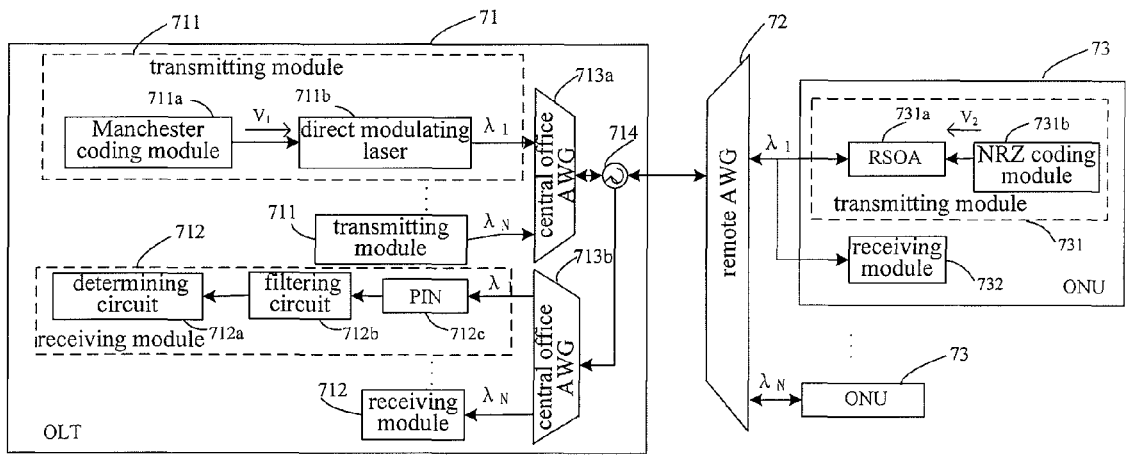
FIG. 7 is a schematic diagram showing a second embodiment of the structure of the system for data transfer in the WDM-PON in an embodiment of the invention.

FIG. 7 shows a second embodiment of the structure of the system for data transfer in the WDM-PON in an embodiment of the invention. As shown in FIG. 7, in this embodiment, the system for data transfer in the WDM-PON includes a central office device, a remote MUX/DEMUX device and N user devices, where N is an integer greater than 1, such as 1, 2, 3, etc.

In this embodiment, the central office device is OLT 71, the remote MUX/DEMUX device is remote AWG 72, and the user device is ONU 73.

The OLT 71 includes N transmitting modules 711, N receiving modules 712, a central office MUX/DEMUX device and a circulator 714. Here the central office MUX/DEMUX device includes central office AWG 713a and central office AWG 713*b*. A respective transmitting module 711 and receiving module 712 are included in the OLT 71 corresponding to each ONU 73.

A Manchester coding module 711*a* in the transmitting module 711 performs Manchester coding on the downstream data, send the coded downstream data to a direct modulating laser 711*b*. The direct modulating laser 711*b* modulates the coded downstream data of rate $\upsilon_1$ onto the optical carrier directly, so as to generate the downstream optical signal carrying the downstream data, where the wavelength of the downstream optical signal is $\lambda_1$. The N downstream optical signals generated by N transmitting modules 711 that carry the downstream data corresponding to N ONUs 73 are multiplexed through the central office AWG 713*a*, and then an optical signal is generated and transmitted to the remote AWG 72 via the circulator 714.

The remote AWG 72 demultiplexes the received downstream optical signal into N optical signals whose wavelengths are $\lambda_1 \sim \lambda_N$, and routes the N optical signals to the N output ports of the remote AWG 72 respectively, so as to send these optical signals to the corresponding ONUs 73. In an ONU 73, the received downstream optical signal is divided into two parts. One part of the downstream optical signal is sent to the receiving module 732, and the receiving module 732 performs detection and demodulation, so as to obtain the downstream data, and the other part of the downstream optical signal is sent to the RSOA 731*a* in the transmitting module 731. The NRZ coding module 731*b* in the transmitting module 731 performs NRZ coding on the upstream data, and sends the coded upstream data to the RSOA 731*a* with rate $\upsilon_2$. The RSOA 731*a* with modulating function modulates the upstream data onto the received downstream optical signal to generate the upstream optical signal, and reflects the upstream optical signal to the remote AWG 72. The ratio of $\upsilon_1$ to $\upsilon_2$ is 4:1. Then the remote AWG 72 multiplexes the received upstream optical signals from the ONUs whose wavelengths are $\lambda_1 \sim \lambda_N$ into one upstream optical signal, and sends this upstream optical signal to the OLT 71.

The upstream optical signal is transmitted to the central office AWG 713*b* via the circulator 714, demultiplexed and sent to the receiving modules 712 corresponding to the demultiplexed upstream optical signals respectively. An upstream optical signal whose wavelength is $\lambda_1$, is converted into the upstream electrical signal via the PIN 712*c*, and then the high frequency carrier signal of the upstream electrical signal is filtered out via the filtering module 712*b*. The obtained envelope signal corresponding to the upstream data is sent to the determining module 712*a*. The determining module 712*a* samples the envelope signal and performs determination to obtain the upstream data.

In the embodiment of the invention, the Manchester coding module 711*a* is used as the coding module in the transmitting module 711 whose coding mode is Manchester coding. When the embodiment of the invention is applied, the coding mode of the coding module may also be the IRZ coding or 8b/10b coding.

In the embodiment of the invention, the direct modulating laser module 711*b* may also be a single wavelength light source and external modulator. The upstream data is externally modulated onto the single wavelength optical signal.

In the embodiment of the invention, the modulating module in the transmitting module 731 may also be a semiconductor optical amplifier with modulating function, an FP-LD with modulating function, or may be an Electro Absorption Modulator (EAM), etc.

In the embodiment of the invention, the central office MUX/DEMUX device and the remote MUX/DEMUX device may also be implemented with a filter. In this embodiment, the MUX/DEMUX device implemented with the Arrayed Waveguide Grating (AWG) is taken as an example.

When the invention is applied, for obtaining the upstream data, the receiving module 712 in the central office OLT 71 may also use the integral module to replace the filtering module, receive the upstream electrical signal from the photo-electric converting module, perform integral calculus for the electrical power of the upstream electrical signal in the upstream bit cycle, and send the integral result to the determining module.

When the integral module is used for obtaining the upstream data, the determining module is used to receive the integral result of the integral module. When the integral value is greater than a preconfigured threshold value, it is determined that the upstream data carried in the upstream bit cycle is 1; otherwise, it is determined that the upstream data in the upstream bit cycle is 0.

Figure 8:
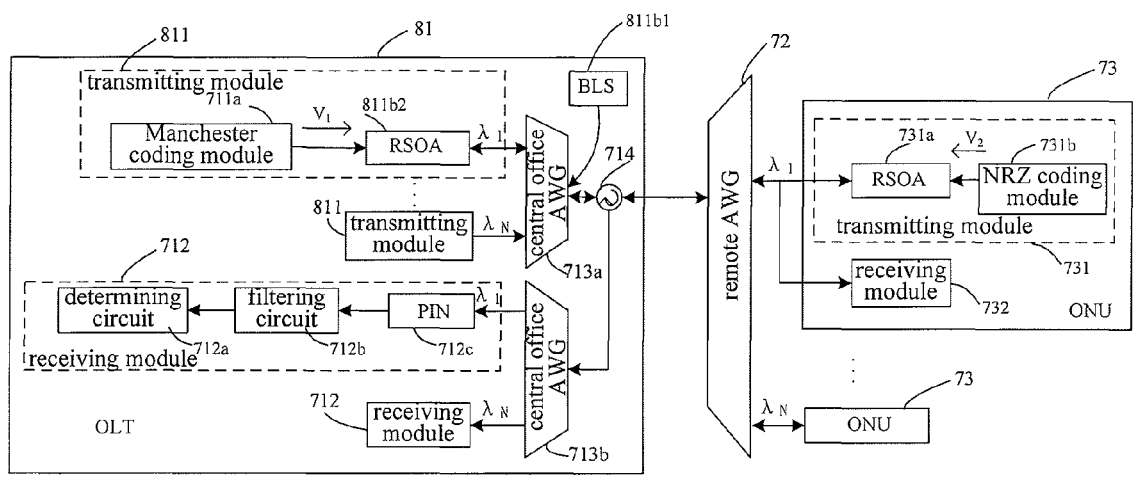
FIG. 8 is a schematic diagram showing a third embodiment of the structure of the system for data transfer in the WDM-PON in an embodiment of the invention.

FIG. 8 shows a third embodiment of the structure of the system for data transfer in the WDM-PON according to an embodiment of the invention. As shown in FIG. 8, the system for data transfer in the WDM-PON according to this embodiment of the invention includes a central office device OLT 81, a remote AWG 72 and ONUs 73.

In this embodiment, the remote AWG 72 and N ONUs 73 are the same as the remote AWG 72 and ONUs 73 in the embodiment as shown in FIG. 7, which will not be illustrated here again. The receiving module 712 and the central office AWG 713*a* as well as the central office AWG 713*b* in the OLT 81 are the same as the receiving module 712 and the central office AWG 713*a* as well as the central office AWG 713*b* in the embodiment as shown in FIG. 7, which will not be illustrated here again. In this embodiment, the Manchester coding module 711*a* in the transmitting module 811 is the same as the Manchester coding module 711*a* in the embodiment as shown in FIG. 7, which will not be illustrated here again.

In the embodiment of the invention, the modulating module includes a broadband light source BLS 811*b*1 and a mode-locked light source RSOA 811*b*2. The BLS 811*b*1 is adapted to perform spectrum slice via the central office AWG 713*a*, generate narrow linewidth light sources, and inversely inject the narrow linewidth light sources into the RSOA 811*b*2.

N transmitting modules 811 share one BLS 811*b*1, i.e., when the BLS 811*b*1 performs spectrum slice via the central office AWG 713*a*, the narrow linewidth light sources with a plurality of wavelengths are generated, so that the narrow linewidth light sources with different wavelengths are provided for the transmitting module 811. The RSOA 811*b*2 is adapted to perform locking and amplifying for the narrow linewidth light sources from the BLS 811*b*1 to generate optical signal, amplitude modulate the optical carrier by the coded downstream data received from the Manchester coding module 711*a*, and send the downstream optical signal carrying the downstream data to the central office AWG 713*a*. When the embodiment of the invention is applied, the mode-locked light source may also be an FP-LD.

In the embodiment of the invention, different modules may be located in the same physical entity.

It can be seen from the above embodiments that in the embodiments of the invention, the upstream data and the downstream data adopt an asymmetric transmission mode, i.e., the ratio of the first rate for downstream optical signal transmission to the second rate for upstream optical signal transmission is greater than 1. Thus, the downstream optical signal used as carrier and the upstream optical signal are differentiated effectively, so that the synchronization device such as clock recover is not required when the amplitude modulation on the upstream data is performed, the complexity of the system as well as the cost of the device are reduced effectively, which boosts the development of the WDM-PON.

Furthermore, in the embodiments of the invention, the downstream optical signal is used as the carrier for the upstream data, and a coding is performed on the downstream data, so that there is optical power for the downstream optical signal corresponding to the downstream data during each downstream bit cycle. Thus, energy is saved, and it is ensured at the same time that the downstream optical signal has a relatively high extinction ratio and transmission performance, and a stable transmission of the downstream data is realized.

The invention may include embodiments of various forms, and is also suitable for the peer to peer transmission mode. Similar to the above method for data transfer, the downstream data of the central office device is coded, modulated with the first rate onto the optical carrier, and then sent to the user device. The user device receives on one hand the downstream light to obtain the downstream data, and on the other hand modulates with the second rate the upstream data onto the downstream light, generates the upstream optical signal, and sends the upstream optical signal to the central office device. Here the ratio of the first rate to the second rate is preferably 4, 6, 8 or 16.

Only preferred embodiments of the present invention are disclosed above, which are not intended to limit the present invention. Accordingly, various modifications, substitutions and variations may be made without departing from the scope of the invention as defined by the appended claims and their equivalents.

What is claimed is:

1. A method for data transfer in an optical network, comprising:
   receiving, at a user terminal, a downstream optical signal from a central office, the downstream optical signal being amplitude modulated with downstream data at a first rate;
   obtaining, at the user terminal, the downstream data from a first part of the received downstream optical signal;
   amplitude modulating, at the user terminal, upstream data to a second part of the received downstream optical signal with a second rate to generate an upstream optical signal, and sending the upstream optical signal to the central office, wherein a ratio of the first rate to the second rate is greater than 1; and
   sending the upstream optical signal from the user terminal to the central office so that the central office receives the upstream optical signal, and obtains the upstream data from the upstream optical signal.

2. The method according to claim 1, wherein the downstream data is coded in Manchester coding, so that there is optical power for the downstream optical signal corresponding to the downstream data during each downstream bit cycle; and the upstream data is coded in nonreturn to zero (NRZ) coding such that every N bits of received optical signal is used to modulated with one bit of upstream data, wherein N is an integer and N:1 represents the ratio of the first rate and the second rate.

3. The method according to claim 1, wherein the downstream data is coded in Inverse Return to Zero (IRZ) coding, so that there is optical power for the downstream optical signal corresponding to the downstream data during each downstream bit cycle; and the upstream data is coded in nonreturn to zero (NRZ) coding such that every N bits of received optical signal is used to modulated with one bit of upstream data, wherein N is an integer and N:1 represents the ratio of the first rate and the second rate.

4. The method according to claim 1, wherein the ratio of the first rate to the second rate is 4, 8 or 16.

5. The method according to claim 1, wherein the optical network is a wavelength division multiplex-passive optical network.

6. The method according to claim 1, wherein the central office obtaining the upstream data from the upstream optical signal further comprises:
   photo-electric converting the upstream optical signal into an upstream electrical signal, performing a low pass filtering on the upstream electrical signal to obtain an envelope signal carrying the upstream data, and obtaining the upstream data through performing sampling and judgment on the envelope signal.

7. An optical network system, comprising a central office device and at least one user device, wherein
   the central office device comprises a transmitting module and a receiving module; wherein the transmitting module of the central office device is configured to amplitude modulate downstream data to an optical carrier with a first rate so as to generate a downstream optical signal carrying the downstream data, and send the downstream optical signal to a user device;
   the user device comprises a transmitting module and a receiving module; wherein the receiving module of the user device is configured to receive the downstream optical signal from the central office device, and obtain the downstream data from a first part of the received downstream optical signal; wherein
   the transmitting module of the user device is configured to amplitude modulate upstream data to a second part of the received downstream optical signal with a second rate so as to generate an upstream optical signal, and send the upstream optical signal to the central office device; wherein a ratio of the first rate to the second rate is greater than 1; and
   the receiving module of the central office is configured to receive the upstream optical signal from the at least one user device, and obtain the upstream data.

8. The system according to claim 7, wherein the transmitting module of the central office device comprises a downstream data coding module and a modulating module; wherein
   the downstream data coding module is configured to perform coding on the downstream data, and send the coded downstream data to the modulating module; and
   the modulating module is configured to amplitude modulate the coded downstream data to the optical carrier with the first rate so as to generate the downstream optical signal carrying the downstream data, and send the downstream optical signal to the user device.

9. The system according to claim 8, wherein the downstream data coding module is configured to code the downstream data such that there is optical power for the downstream optical signal that is amplitude modulated with the encoded downstream data during each downstream bit.

10. The system according to claim 9, wherein the receiving module of the central office device comprises a photo-electric converting module, an integral module, a filtering module and a determining module, wherein
   the photo-electric converting module is configured to convert the upstream optical signal received into an upstream electrical signal, and send the upstream electrical signal to the integral module;

the integral module is configured to receive the upstream electrical signal from the photo-electric converting module, perform integral calculus on an electrical power of the upstream electrical signal in the upstream bit cycle, and send an integral result to the determining module;

the filtering module is configured to receive the upstream electrical signal from the photo-electric converting module, perform a low pass filtering on the upstream electrical signal, and send an envelope signal representing the upstream data to the determining module; and the determining module is configured to receive the integral result from the integral module, when an integral value is greater than a preconfigured threshold value, it is determined that the upstream data carried in the upstream bit cycle is 1; otherwise, it is determined that the upstream data in the upstream bit cycle is 0; and/or is configured to receive the envelope signal from the filtering module, and perform a determination on the envelope signal to obtain the upstream data.

11. The system according to claim 7, wherein the transmitting module in the user device comprises an upstream data coding module and a modulating module, wherein the upstream data coding module is configured to perform coding on the upstream data, and send coded upstream data to the modulating module; and the modulating module is configured to receive the coded upstream data from the upstream data coding module as well as the downstream optical signal from the central office device, amplitude modulate the coded upstream data the downstream optical signal with the second rate so as to generate the upstream optical signal, and send the upstream optical signal to the central office device, wherein the ratio of the first rate to the second rate is greater than 1.

12. A central office device, comprising a transmitting module and a receiving module, wherein the transmitting module is configured to amplitude modulate downstream data to an optical carrier with a first rate so as to generate a downstream optical signal carrying the downstream data, and send the downstream optical signal to at least one user device; and the receiving module is configured to receive an upstream optical signal from the at least one user device, and obtain the upstream data from a part of the received downstream optical signal, wherein the downstream optical signal is amplitude modulated by the upstream data with a second rate, and a ratio of the first rate to the second rate is greater than 1.

13. The central office device according to claim 12, wherein the transmitting module comprises a downstream data coding module and a modulating module, wherein the downstream data coding module is configured to perform coding on the downstream data, and send the coded downstream data to the modulating module; and the modulating module is configured to receive the coded downstream data from the downstream data coding module, amplitude modulate the coded downstream data to the optical carrier by with the first rate so as to generate the downstream optical signal carrying the downstream data, and send the downstream optical signal to the user device.

14. The central office device according to claim 12, wherein the central office device performs coding on the downstream data with Manchester coding or Inverse Return to Zero coding.

15. A user device, comprising a receiving module and a transmitting module, wherein the receiving module is configured to receive an downstream optical signal, obtain downstream data from a first part of the received downstream optical signal, wherein a rate of the downstream data is a first rate; and the transmitting module is configured to amplitude modulate upstream data to a second part of the received downstream optical signal with a second rate so as to generate an upstream optical signal, and send the upstream optical signal to a central office device;

wherein a ratio of the first rate to the second rate is greater than 1.

16. The user device according to claim 15, wherein the transmitting module comprises an upstream data coding module and a modulating module, wherein the upstream data coding module is configured to perform coding on the upstream data, and send the coded upstream data to the modulating module; and the modulating module is configured to amplitude modulate the coded upstream data to the downstream optical signal with the second rate so as to generate the upstream optical signal, and send the upstream optical signal to the central office device, wherein the ratio of the first rate to the second rate is greater than 1.

17. The user device according to claim 16, wherein the downstream data is such a data that is coded with Manchester coding or Inverse Return to Zero coding.

* * * * *